(12) United States Patent
Hosono

(10) Patent No.: US 8,752,012 B2
(45) Date of Patent: Jun. 10, 2014

(54) PROCESS EVALUATION DEVICE, PROGRAM AND METHOD

(75) Inventor: Shigeru Hosono, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/881,223

(22) PCT Filed: Sep. 7, 2012

(86) PCT No.: PCT/JP2012/073553
§ 371 (c)(1),
(2), (4) Date: Apr. 24, 2013

(87) PCT Pub. No.: WO2013/042617
PCT Pub. Date: Mar. 28, 2013

(65) Prior Publication Data
US 2013/0219359 A1    Aug. 22, 2013

(30) Foreign Application Priority Data

Sep. 19, 2011  (JP) ................................. 2011-203977

(51) Int. Cl.
*G06F 9/44* (2006.01)

(52) U.S. Cl.
USPC ........... 717/120; 717/101; 717/121; 717/168; 717/170

(58) Field of Classification Search
None
See application file for complete search history.

(56) References Cited

U.S. PATENT DOCUMENTS

| | | | |
|---|---|---|---|
| 7,062,495 B2 | 6/2006 | Nishigaki et al. | |
| 7,565,382 B1* | 7/2009 | Sobel ................................ | 1/1 |
| 8,056,056 B2* | 11/2011 | Eldridge et al. ............... | 717/121 |
| 8,060,862 B2* | 11/2011 | Eldridge et al. ............... | 717/121 |
| 8,225,271 B2* | 7/2012 | Eldridge et al. ............... | 717/101 |
| 8,397,229 B2* | 3/2013 | Sun et al. ....................... | 717/168 |
| 2003/0195900 A1 | 10/2003 | Nishigaki et al. | |
| 2008/0222604 A1* | 9/2008 | Murphy ......................... | 717/120 |
| 2008/0270986 A1* | 10/2008 | Simeonov et al. ............. | 717/120 |
| 2009/0064125 A1* | 3/2009 | Venkatachalam et al. ..... | 717/170 |
| 2011/0023017 A1* | 1/2011 | Calvin ........................... | 717/120 |

FOREIGN PATENT DOCUMENTS

| | | |
|---|---|---|
| JP | 09-223164 A | 8/1997 |
| JP | 2000-200303 A | 7/2000 |
| JP | 2000-322252 A | 11/2000 |
| JP | 2003-303213 A | 10/2003 |

(Continued)

OTHER PUBLICATIONS

Office Action dated Jun. 11, 2013, issued by the Japan Patent Office, in counterpart application No. 2013517502.

*Primary Examiner* — Thuy Dao
(74) *Attorney, Agent, or Firm* — Sughrue Mion, PLLC

(57) ABSTRACT

A process evaluation device, comprising: a development process definition storage unit which stores definition information on a plurality of processes for developing software and sequence numbers thereof; a transition information acquiring unit which acquires identification information or a sequence number of a new process after a backward transition occurs, wherein a process transition from a certain process referred hereafter as an evaluation origin to said new process is said backward transition when a sequence number of said new process is smaller than a sequence number of said evaluation and a transition information analysis unit which calculates and thereby outputs a backing-away distance which is a difference between a sequence number of said evaluation origin and a sequence number of said new process, is provided, in order to apprehend what are real causes of the development delay.

19 Claims, 14 Drawing Sheets

(56) References Cited

FOREIGN PATENT DOCUMENTS

| | | | |
|---|---|---|---|
| JP | 4088760 B2 | 5/2008 |
| JP | 2010-102615 A | 5/2010 |
| JP | 4704461 B2 | 6/2011 |
| JP | 2012194699 A | 10/2012 |

* cited by examiner

Fig.3

| PROCESS IDENTIFICATION INFORMATION | SEQUENCE NUMBER | EVALUATION CARDINAL POINT | BACKING-AWAY DISTANCE |
| --- | --- | --- | --- |
| REQUIREMENT DEFINITION | 1 | | 4 |
| ARCHITECTURE DESIGN | 2 | | 3 |
| FUNCTION DESIGN | 3 | | 2 |
| RESOURCE DESIGN | 4 | | 1 |
| PROTOTYPE DESIGN | 5 | ○ | 0 |
| INTEGRATION TEST | 6 | | — |
| ACTUAL EXECUTION | 7 | | — |

| BACKING-AWAY DISTANCE | NUMBER OF OCCURRENCES OF BACKWARD TRANSITION |
|---|---|
| 3 (FIRST BACKING-AWAY DISTANCE) | 3 (FIRST NUMBER OF TIMES) |

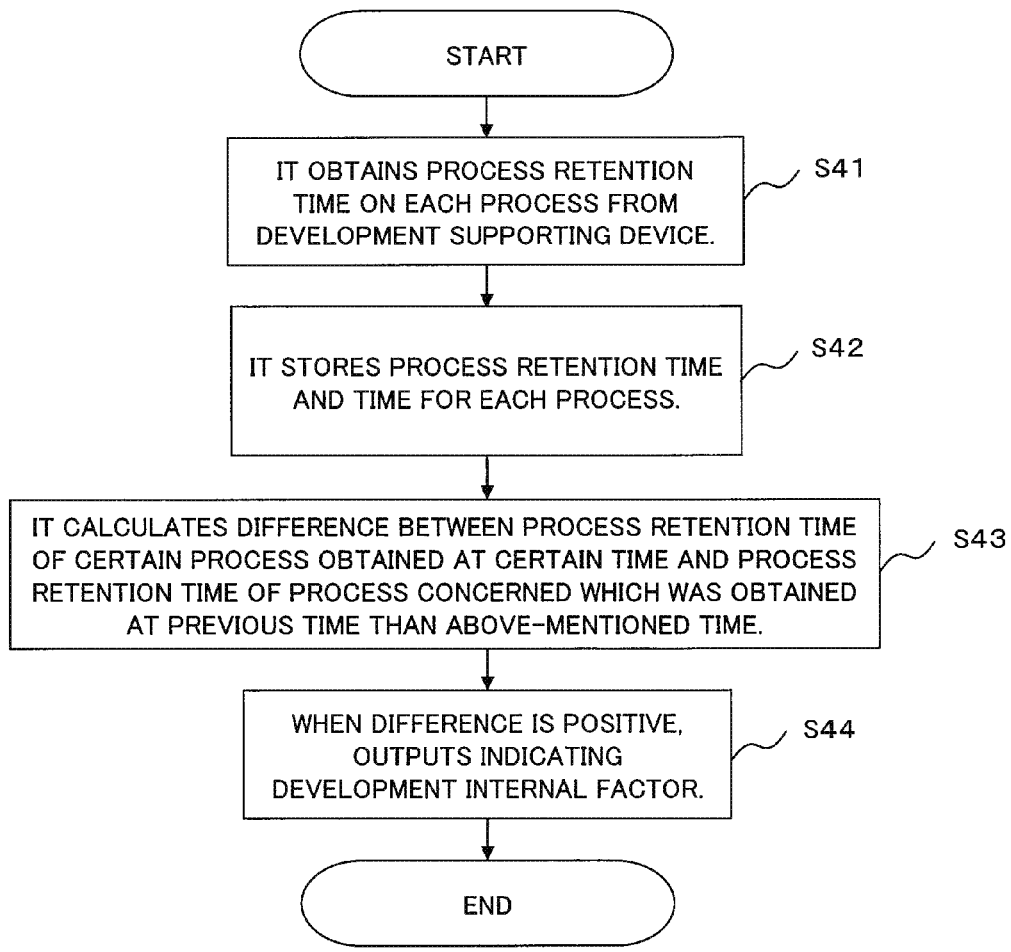

PROCESS EVALUATION DEVICE, PROGRAM AND METHOD

CROSS REFERENCE TO RELATED APPLICATIONS

This application is a National Stage of International Application No. PCT/JP2012/073553, filed on Sep. 7, 2012, which claims priority from Japanese Patent Application No. 2011-203977, filed on Sep. 19, 2011, the contents of all of which are incorporated herein by reference in their entirety.

TECHNICAL FIELD

The present invention relates to a process evaluation device, a program thereof and a method thereof.

BACKGROUND ART

Some development methods for applications include Agile development and Iteration development. Agile development and Iteration development are development methods in which developers partially complete functions and then complete functions step by step repeating development processes after performing a series of development processes from start to end once again. According to this kind of development method, although a user can confirm partially completed functions from an early stage in a development period, following problems are remaining.

For example, in Agile development and Iteration development, function requirements are not determined at an early stage. Therefore, when a delay in the development period is caused while repeatedly performing the development processes, there is a problem that it is difficult to apprehend whether a cause of delay is on factors due to outside of a developers team (i.e. external development factor) such as customer requirement change or a cause of delay is on factors due to inside of the developers team (i.e. internal development factor) such as shortage of number of developers and their skills or shortage of available developing hardware facilities or developing software facilities. In addition, there is also a problem that it is difficult to estimate whether or not reconsideration of the design or working steps needed for the reconsideration are reasonable or not.

The Japanese Patent Application Laid-Open No. 2010-102615 disclosed an example of a process re-engineering in which it analyzes getting back of processes when a process on a workflow changes. In addition, the Japanese Patent Application Laid-Open No. 2000-322252 disclosed an example of a project management supporting device for finding risks when a development operation is not performed as is planned after confirming validity of a process schedule of a software development project.

SUMMARY OF THE INVENTION

Problem to be Solved by the Invention

However, in the above-mentioned technologies, there is a problem that it cannot apprehend what are real causes of the development delay.

Accordingly, in order to settle the above-mentioned problems, an object according to the present invention is to provide a process evaluation device, a program thereof and a method thereof which can apprehend causes of the development delay.

Means for Solving Problem

In order to achieve the above-mentioned objects, a process evaluation device according to the present invention includes a development process definition storage means for storing definition information on a plurality of processes for developing software and sequence numbers thereof, a transition information acquisition means for acquiring identification information or a sequence number of process after transition when a sequence number of process which was transited next to specified process that is an evaluation cardinal point (also referred as evaluation origin) is smaller than a sequence number of above-mentioned evaluation cardinal point, and a transition information analysis means for calculating and thereby outputting a backing-away distance which is a difference between a sequence number of above-mentioned evaluation cardinal point and a sequence number of above-mentioned process which above-mentioned transition information acquisition means acquired.

In addition, the present invention provides a process evaluation program which executes with a computer having a development process definition storage means for storing definition information on a plurality of processes for developing software and sequence numbers thereof, including a transition information acquisition step for acquiring identification information or a sequence number of process after transition when a sequence number of process which was transited next to specified process that is an evaluation cardinal point is smaller than a sequence number of above-mentioned evaluation cardinal point, and a transition information analysis step for calculating and thereby outputting a backing-away distance which is a difference between a sequence number of above-mentioned evaluation cardinal point and a sequence number of above-mentioned process which above-mentioned transition information acquisition means acquired.

In addition, the present invention provides a process evaluation method which includes storing of a definition information on a plurality of processes for developing software and sequence numbers thereof, acquiring of identification information or a sequence number of process after transition when a sequence number of process which was transited next to specified process that is an evaluation cardinal point is smaller than a sequence number of above-mentioned evaluation cardinal point, and calculating and thereby outputting of a backing-away distance which is a difference between a sequence number of above-mentioned evaluation cardinal point and a sequence number of above-mentioned process which above-mentioned transition information acquisition means acquired.

Effect of the Invention

The present invention provides a process evaluation device which can apprehend cause of development delay, a program thereof and a method thereof.

BRIEF DESCRIPTION OF DRAWINGS

FIG. 3 is a figure illustrating an example of a development process definition, an evaluation cardinal point and a backing-away distance.

FIG. 14 is a figure showing an example of the standard transition analysis information storage unit according to the third exemplary embodiment.

FIG. 15 is a figure showing an example of an operation according to the fourth exemplary embodiment.

DESCRIPTION OF EMBODIMENT

Hereinafter, it will describe exemplary embodiments according to the present invention with reference to the figures. In all figures, it attaches the same codes are attached to the same elements, and descriptions are omitted appropriately.

Where, each unit which configures the device or the like of each exemplary embodiment is configured by hardware such as logic circuits. In addition, each unit includes a control part of a computer, a memory, a program loaded in the memory, a storage unit such as hard disks which stores the program and an interface for network connection, and they can be realized by optional combination of hardware and software. Further, as far as there is no annotation, there are no limitations for realization methods and devices.

In addition, a control unit is composed of CPU (Central Processing Unit) or the like, and controls entire device by executing OS (Operating System), and executes various processes according to programs and data which are readout from recording media mounted on a driving device to the memory. These recording media include such as an optical disk, a flexible disk, a magneto-optical disk, an external hard disk and a semiconductor memory or the like, and it records computer programs so that the computer can readout them. In addition, these computer programs can be downloaded from an external computer which is not illustrated and is connected with communication networks.

<Exemplary Embodiment 1>

Then, it will describe the first exemplary embodiment according to the present invention with reference to the figures.

Figure 1:
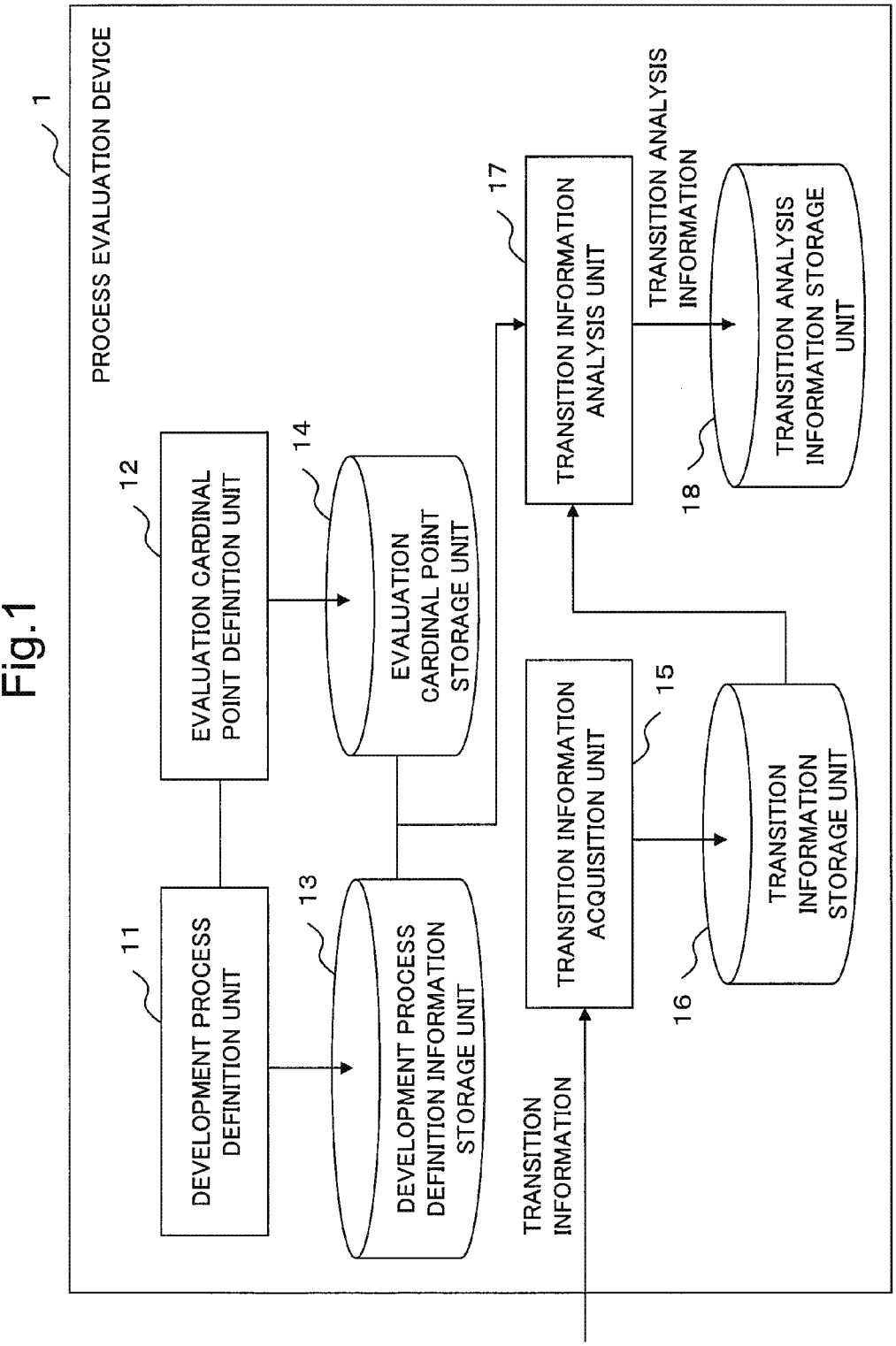
FIG. 1 is a figure showing an example of a configuration according to the first exemplary embodiment.

FIG. 1 shows an example of the configuration of a process evaluation device 1 according to the exemplary embodiment. As shown in FIG. 1, the process evaluation device 1 includes a development process definition unit 11, an evaluation cardinal point configuration unit 12, a development process definition information storage unit 13, an evaluation cardinal point storage unit 14, a transition information acquisition unit 15, a transition information storage unit 16, a transition information analysis unit 17 and a transition analysis information storage unit 18. In addition, the process evaluation device 1 can be connected by a communication circuit or the like to a development supporting device which is not illustrated.

Figure 2:
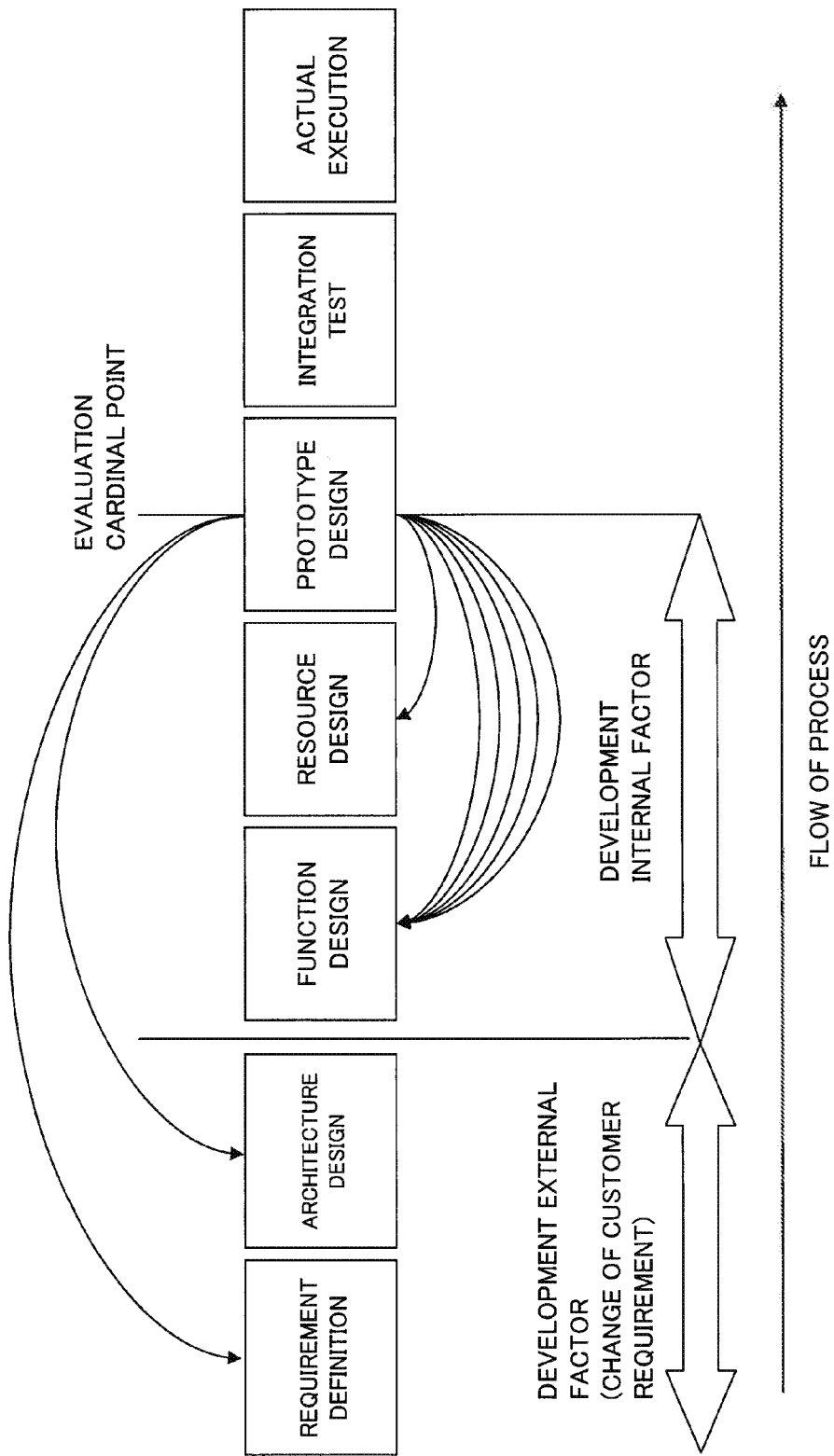
FIG. 2 is a figure illustrating an example of a process transition.

The development process definition unit 11 is a means for defining development processes of application software or the like. For example, process evaluators or the like define each development process and a sequence number of each development process for an application as shown in FIG. 2 and FIG. 3 via the development process definition unit 11. Although a typical development process of an application and a flow thereof are illustrated in FIG. 2, the number of processes and the sequence number thereof are not limited by the figure.

The process evaluators or the like specify process identification information which is a classification of each development process and the sequence number thereof as shown in FIG. 3 using the development process definition unit 11. In FIG. 3, processes includes a requirement definition, an architecture design, a function design, a resource design, a prototype design, an integration test and an actual execution are defined as the process identification information. In addition, the sequence numbers 1 to 7 are defined, after correlating with each one of the process identification information.

The development process definition unit 11 stores the defined process identification information and the sequence number thereof in the development process definition information storage unit 13. In addition, the development process definition unit 11 can transmit the defined process identification information and the sequence number thereof to a development supporting device which is not illustrated.

By an input of the process evaluators or the like, the evaluation cardinal point configuration unit 12 specifies a development process which becomes an evaluation cardinal point after correlating with one of process identification information or the sequence number which are defined in the development process definition unit 11. FIG. 3 shows an example where, as the evaluation cardinal point, the process identification information corresponding to the process of the prototype development is specified as the evaluation cardinal point. The evaluation cardinal point configuration unit 12 stores specified evaluation cardinal point in the evaluation cardinal point storage unit 14. The evaluation cardinal point specified in the evaluation cardinal point configuration unit 12 is a process which is the cardinal point of backward transition which will be described later.

The transition information acquisition unit 15 acquires transition information (i.e. process identification information or the sequence number thereof) on the development process from a development supporting device or the developers or the like which are not illustrated. A development design supporting device is so-called CASE (Computer Aided Software Engineering) tool, and is a device which supports development of applications or the like which a user or the like performs. Whenever the development process of applications or the like which the user or the like performs transits, the development supporting device transmits the process identification information defined in the development process definition unit 11 or the sequence number thereof to the transition information acquisition unit 15. Where, the development supporting device can acquire the process identification information and the sequence number of the process identification information defined by the development process definition unit 11 from the development process definition unit 11 in advance before the application development will be started, or can refer to the development process definition information storage unit 13 and acquire the defined process identification information and the sequence number thereof.

Further, the development supporting device, instead of transmitting entire transition information whenever the development process transits to the transition information acquisition unit 15, transmits the transition information on transition of afterwards development process after the process reached to the evaluation cardinal point to the transition information acquisition unit 15.

In addition, the development supporting device can transmit the transition information on a process after transition, when the sequence number of process which was transited next to a process which reached to the evaluation cardinal point is smaller than the sequence number of the evaluation cardinal point, to the transition information acquisition unit 15. For example, according to the exemplary embodiment, because the sequence number of the prototype development process which is an evaluation cardinal point is 5, only in the case that the process transited to one of the process among the requirement definition, the architecture design, the function design and the resource design which are the processes before the prototype development process (i.e. sequence number of 1 to 4) after the process reaches to the prototype development process which is the evaluation cardinal point, the development supporting device or the developers or the like can transmit the transition information (i.e. process identification information and sequence number thereof) to the transition information acquisition unit 15. The transition information acquisition unit 15 stores the acquired transition information in time series in the transition information storage unit 16.

The transition information analysis unit 17 calculates a backing-away distance which is a difference between the sequence number of process after the transition in transition (i.e. these kind of the transition of the process is referred to as backward transition) where the sequence number of process which was transited next to the process that is the evaluation cardinal point is smaller than the sequence number of the evaluation cardinal point and the sequence number of process which is the evaluation cardinal point.

For example, as shown in FIG. 3, when the process identification information which is an evaluation cardinal point is the prototype development, in the case that the process transited next to the prototype development (i.e. the sequence number is 5) is the requirement definition (i.e. sequence number is 1), then the difference 4 (=5−1) of the sequence number between these processes will be the backing-away distance. As shown in FIG. 3, because the integration test process and the actual execution process are the processes defined after the prototype development process, the backing-away distance is not calculated. The transition information analysis unit 17 stores the calculated backing-away distance in the transition analysis information storage unit 18.

Where, when the calculated backing-away distance is equal to or more than specified distance designated in advance, the transition information analysis unit 17 may notify an alarm to the developers or the process evaluators or the like. When a development delay occurred, the alarm intimates a possibility that the development delay has occurred because of development external factors. Because the backing-away distance is equal to or more than specified distance intimates that the development has returned to an initial process, it indicate a possibility that the development delay has occurred and is caused by the customer requirement change because it returned to the initial process of the development.

The transition information analysis unit 17 can keep calculating the backing-away distance while a period from the development of applications or the like are started to it is completed, or while a designated period from the start of the evaluation of the processes to the completion. For example, as shown in FIG. 2, while a period from a start of the requirement definition to a finish of the development of the applications by reaching the actual execution, the transition information analysis unit 17 calculates one time for the backing-away distance 4, one time for the backing-away distance 3, five times for the backing-away distance 2 and one time for the backing-away distance 1 respectively, when backward transition occurs one time for the requirement definition, one time for the architecture design, five times for the function design and one time for the resource design from the prototype development which is the evaluation cardinal point. The transition information analysis unit 17 stores these backing-away distances and the number of times of the calculation in the transition analysis information storage unit 18.

Where, the transition information analysis unit 17 can apprehend start/finish of a process by acquiring information indicating start/finish of the process from the development supporting device. In addition, concerning on start/finish of the evaluation, the transition information analysis unit 17 can apprehend start/finish of the evaluation by acquiring information through an input of predetermined information indicating start/finish of the evaluation of the process evaluators or the like to the process evaluation device 1 and the like.

Figure 6:
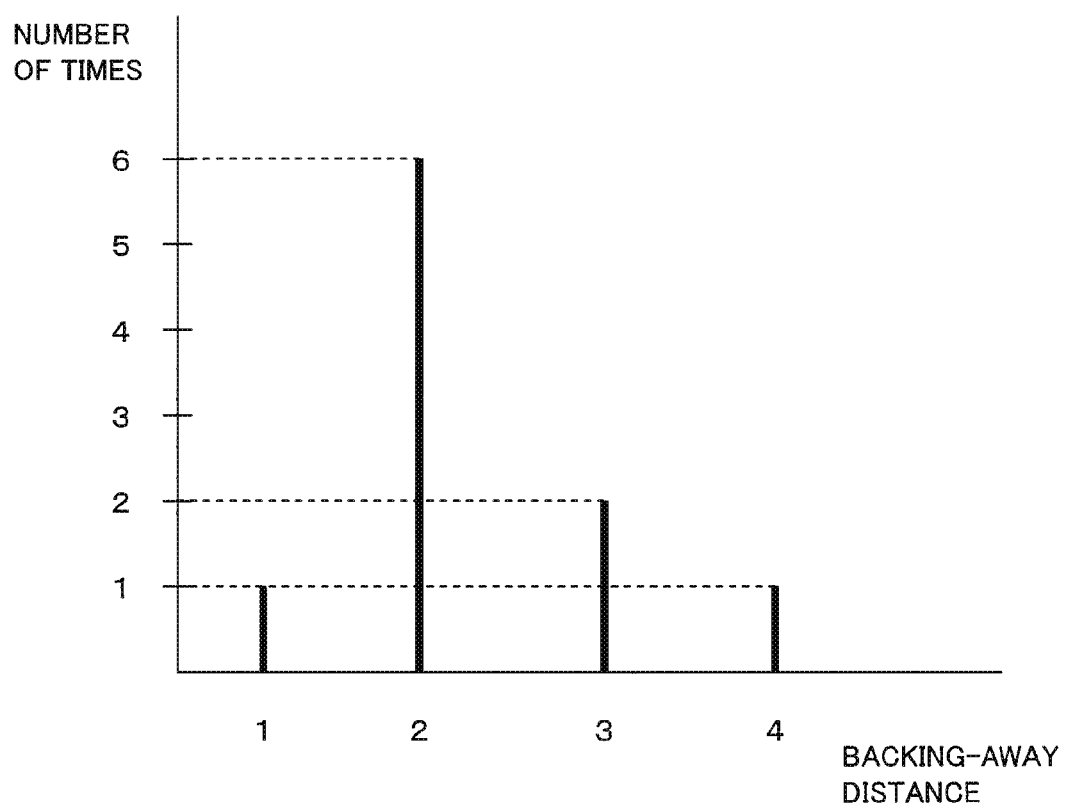
FIG. 6 is a figure showing an example of a backing-away distance and a number of times.

In addition, the transition information analysis unit 17 can output the backing-away distance and the number of times concerned backing-away distance is calculated to the display unit or the like which is not illustrated in the figures. For example, FIG. 6 shows a graph in which horizontal axis is the backing-away distance and vertical axis is the number of times the backing-away distance is calculated (hereinafter, it also referred to "counts" or "number of times it is calculated"). FIG. 6 is a graph showing the backing-away distance and the number of times it is calculated which the transition information analysis unit 17 calculated during the predetermined period, and indicating that one time for the backing-away distance 1, six times for the backing-away distance 2, two times for the backing-away distance 3 and one time for the backing-away distance 4. Following to the graph in FIG. 6, the process evaluators or the like can apprehend that the development delay is caused by either the development internal factor or the development external factor. It will describe the reason. In the case that the development delay is occurred, when backward transition whose backing-away distance is less than specified value occurred equal to or more than specified number of times, because it indicates that the backward transition is frequently occurred in the process of the function design and the resource design, it can presume that the delay is caused by a factor inside of the developing team (i.e. development internal factor) such as a shortage of the number of developers and their skills or a shortage of available hardware developing facilities and software developing facilities.

On the other hand, when the development delay is occurred and backward transition whose backing-away distance is equal to or more than specified value occurred equal to or more than specified number of times, because it indicates that frequent backward transition to the initial process are occurring, it can presume that the delay is caused by a factor outside of the developing team (i.e. development external factor) such as changes of the customer requirements. Where, specified distance and specified number of times are the distance and the number of times that the process evaluators or the like designated in advance, and these are decided by a standard iteration in the software development as an example.

Therefore, following to the graph in FIG. 6, the process evaluators or the like can apprehend that the development delay is caused by either the development internal factor or the development external factor. For example, it supposes that specified distance is 3 and specified number of times is 4, in the graph in FIG. 6, then the number of times of backward transition whose backing-away distance is less than 3 occurred in seven times (i.e. one time for the backing-away distance is 1, and the six times for the backing-away distance is 2). Because this number of times is larger than four times which is specified number of times, when the development delay occurred, it is presumed that the cause of development delay is the development internal factor.

On the other hand, backward transition whose number of times of occurrence of the backing-away distance equal to or more than 3 is three times (i.e. two times for the backing-away distance 3, and one time for the backing-away distance 4). Because it indicates that the number of times that it returned back to the initial process of the development such as the requirement definition and the architecture design is smaller than specified number of times, even if the development delay occurred, it can presume that the cause of development delay is not the development external factor.

Figure 4:
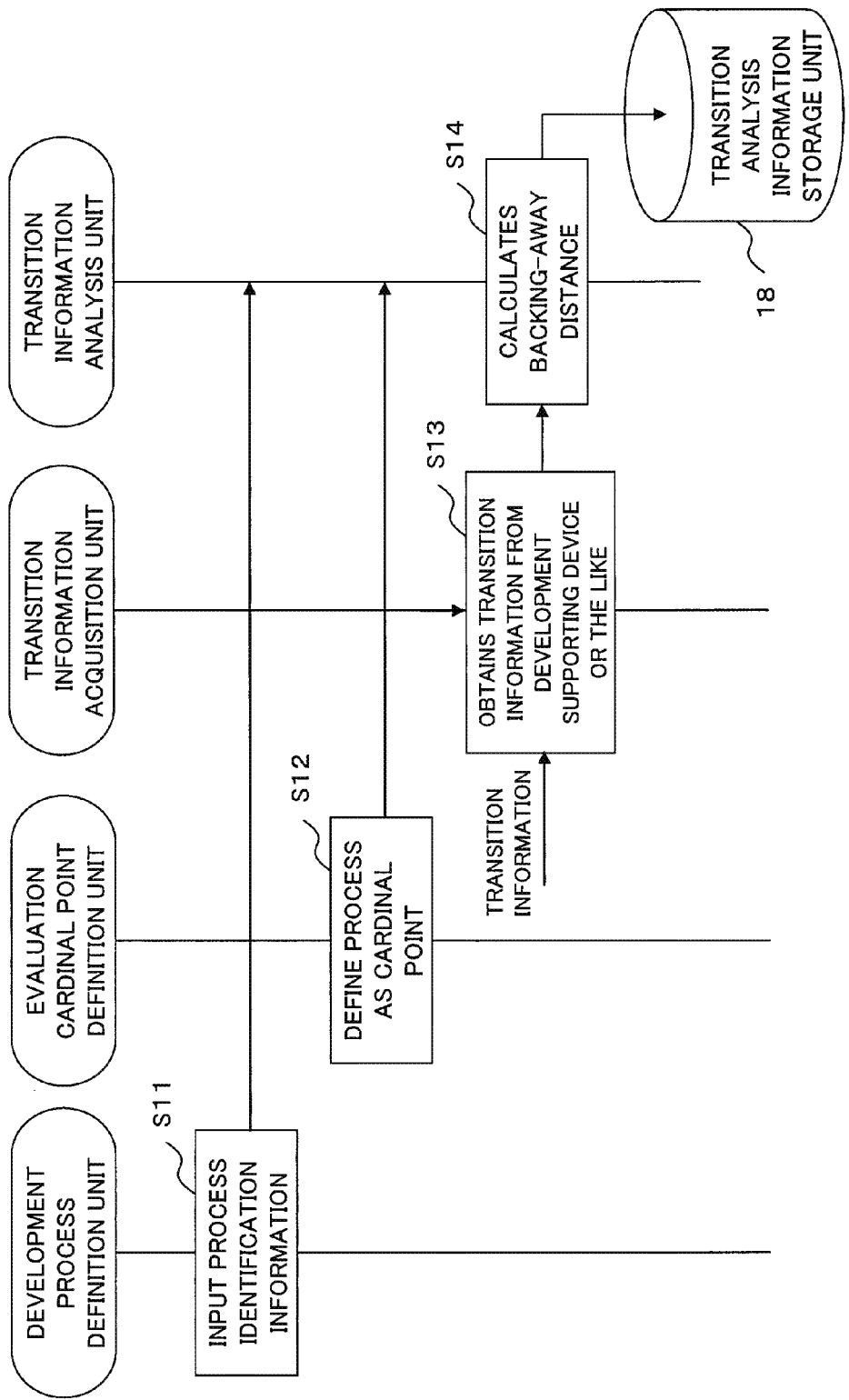
FIG. 4 is a figure showing an example of an operation according to the first exemplary embodiment.
Figure 5:
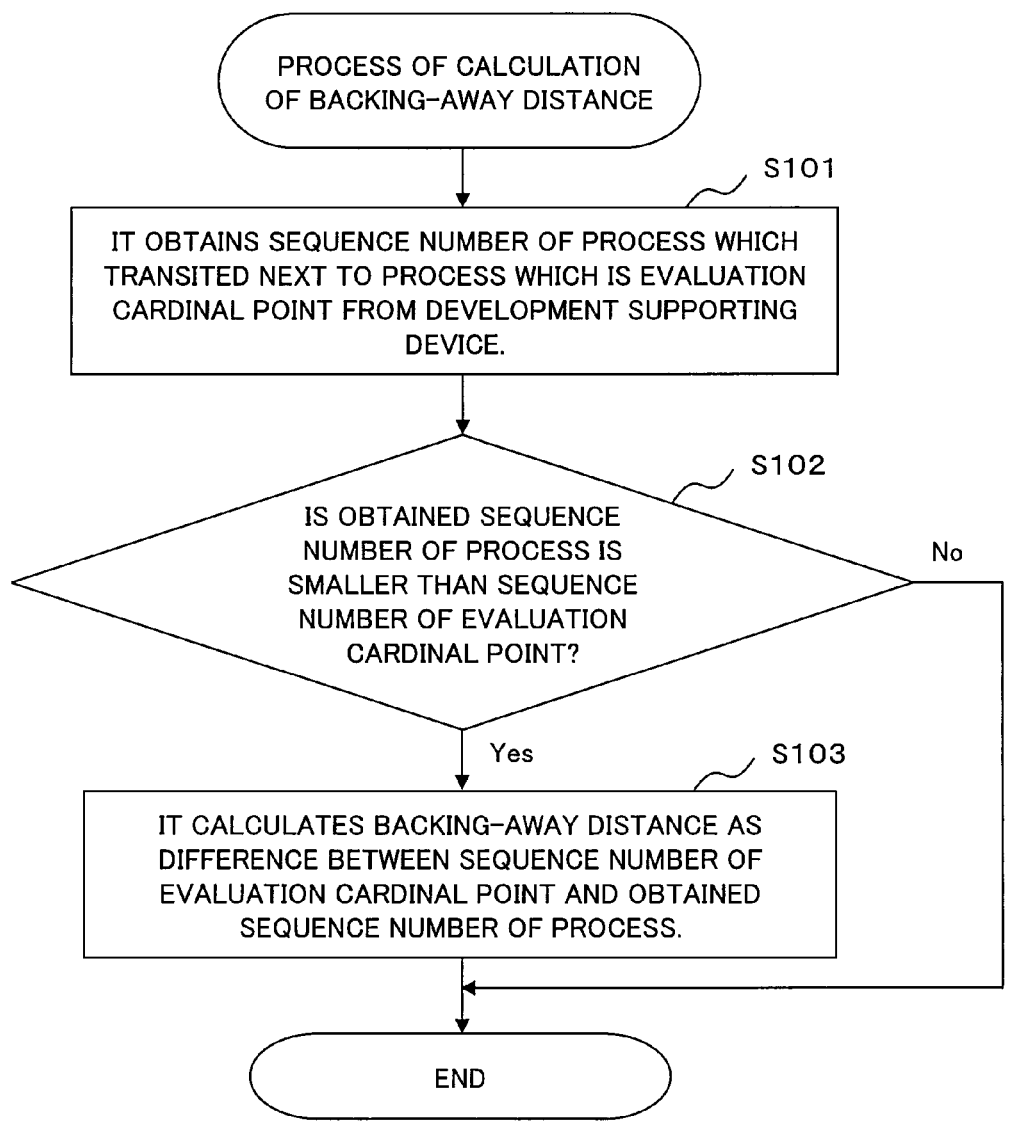
FIG. 5 is a figure showing an example of an operation according to the first exemplary embodiment.

Then, it will describe an example of the operation of the process evaluation device 1 according to the exemplary embodiment with reference to FIG. 4 and FIG. 5.

As shown in FIG. 4, in the process evaluation device 1, the process evaluators or the like initially input the process identification information and the information which defines the sequence number thereof (i.e. process definition information) using the development process definition unit 11 (Step S11) as shown in FIG. 3. The development process definition unit 11 stores the defined information in the development process definition information storage unit 13. In addition, the process evaluators or the like specify a process which is an evaluation cardinal point using the evaluation cardinal point configuration unit 12 (Step S12). That is, as shown in FIG. 3, the process evaluators or the like specify the process identification information which is an evaluation cardinal point using the evaluation cardinal point configuration unit 12. The evaluation cardinal point configuration unit 12 stores the information on specified evaluation cardinal point in the evaluation cardinal point storage unit 14.

The transition information acquisition unit 15 acquires the transition information (i.e. process identification information or the sequence number thereof) on the development process from the development supporting device or the like (Step S13). The transition information acquisition unit 15 stores the acquired transition information in the transition information storage unit 16. The transition information analysis unit 17 refers to the development process definition information storage unit 13, the evaluation cardinal point storage unit 14 and the transition information storage unit 16, and calculates the backing-away distance (Step S14). Then, the transition information analysis unit 17 stores the calculated backing-away distance in the transition information analysis information storage unit 18. Where, the transition information analysis unit 17 can also store the number of times the backing-away distance is calculated after correlating with the backing-away distance in the transition information analysis information storage unit 18. The backing-away distance and the number of times the backing-away distance is calculated are also denoted as transition analysis information.

It will describe calculation of the backing-away distance in Step S14 with reference to FIG. 5.

First, the transition information analysis unit 17 acquires the sequence number of process which transited next to the process which is an evaluation cardinal point, from the development supporting device or the like (Step S101). As is described above, when the transition information acquisition unit 15 is acquiring the transition information whenever the process transits from the development supporting device or the like, the transition information analysis unit 17 deletes the sequence number of process other than transited next to the evaluation cardinal point, and acquires the sequence number of process transited next to the evaluation cardinal point.

Then, the transition information analysis unit 17 determines whether or not the acquired sequence number of the process is smaller than the sequence number of the evaluation cardinal point (Step S102). When the acquired sequence number of the process is smaller than the sequence number of the evaluation cardinal point (Yes in Step S102), the transition information analysis unit 17 calculates the difference (i.e. backing-away distance) between the sequence number of the evaluation cardinal point and the acquired sequence number of the process (Step S103). On the other hand, when the acquired sequence number of the process is larger than the sequence number of the evaluation cardinal point (No in Step S102), this means that a process in which the developer or the like is staying transited to a latter process than the evaluation cardinal point, the transition information analysis unit 17 finishes without calculating the backing-away distance.

Where, although it has described a case where the transition information analysis unit 17 determines whether or not the sequence number of process is smaller more than the sequence number of the evaluation cardinal point, the transition information acquisition unit 15 or the development supporting device or the like can determine whether or not the sequence number of process is smaller than the sequence number of the evaluation cardinal point.

According to the exemplary embodiment, when a transited process next to the process which is the evaluation cardinal point is a previous process than the evaluation cardinal point, the transition information analysis unit 17 calculates a backing-away distance which is defined by the difference between the sequence number of process which is the evaluation cardinal point and the sequence number of process after the transition. When the calculated backing-away distance is equal to or more than specified distance designated in advance, the transition information analysis unit 17 can output an alarm to the developers or the process evaluators or the like. In addition, the transition information analysis unit 17 can show a graph with which it can apprehend the backing-away distance and the number of times the backing-away distance is calculated as shown in FIG. 6.

Therefore, according to the exemplary embodiment, a development process evaluation device, the program thereof and the method thereof are provided in which it can apprehend a cause of development delay by a size of backing-away distance and the number of times the backing-away distance is calculated or the like.

<Exemplary Embodiment 2>

Figure 7:
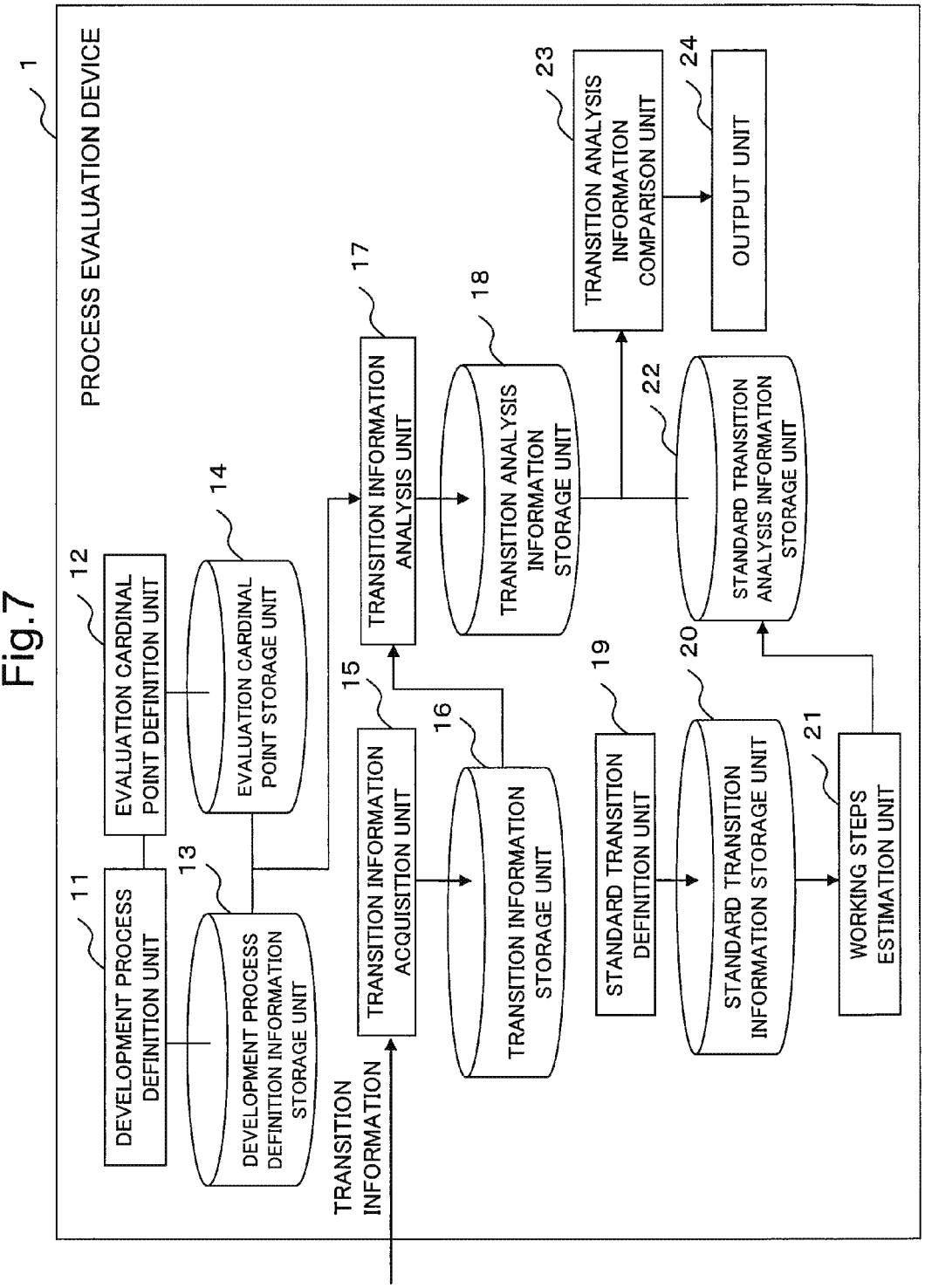
FIG. 7 is a figure showing an example of a configuration according to the second exemplary embodiment.

Then, it will describe the second exemplary embodiment according to the present invention with reference to the figures. FIG. 7 shows an example of the configuration of the process evaluation device 1 according to the exemplary embodiment. As shown in FIG. 7, the process evaluation device 1 includes a standard transition configuration unit 19, a standard transition information storage unit 20, a working steps estimation unit 21, a standard transition analysis information storage unit 22, a transition analysis information comparison unit 23 and an output unit 24 in addition to the configuration described in the first exemplary embodiment. It will omit descriptions for the same configuration as the first exemplary embodiment.

The process evaluators or the like specify the information on the process transition (i.e. standard transition information) in which it is assumed that the developers retrace while start to finish of the development of such as the application using the standard transition configuration unit 19. For example, as shown in FIG. 2, because it is assumed that the backward transition of the processes will be occurred in Agile development and Iteration development, the process evaluators or the like can specify the following information as the standard transition information ahead in to the transition starting from the process of the requirement definition to the process of the actual execution. As an example of transition of the process, it specifies "requirement definition->architecture design->function design->resource design->prototype development->architecture design->function design->resource design->prototype development->architecture design->function design->resource design->prototype development->resource design->prototype development->integration test->actual execution" as the standard transition information. Thus, the standard transition information which is specified in this way is stored in the standard transition information storage unit 20.

The working steps estimation unit 21 calculates the backing-away distance for the standard transition indicated by the standard transition information stored in the standard transition information storage unit 20. That is, the working steps estimation unit 21 calculates the backing-away distance, as is similar to the first exemplary embodiment, for backward transition among the standard transition from the evaluation cardinal point designated in advance by the evaluation cardinal point configuration unit 12. For example, in the case that the prototype development is a process of the evaluation cardinal point and the standard transition information is described within the above-mentioned quotation mark (i.e. " "), backward transition includes three transition: "prototype development->architecture design", "prototype development->architecture design" and "prototype development->resource design", and the backing-away distances are 3, 3 and 1 respectively. That is, by the working steps estimation unit 21, it calculates that two times for the backing-away distance 3 and once time for the backing-away distance 1.

Figure 9:
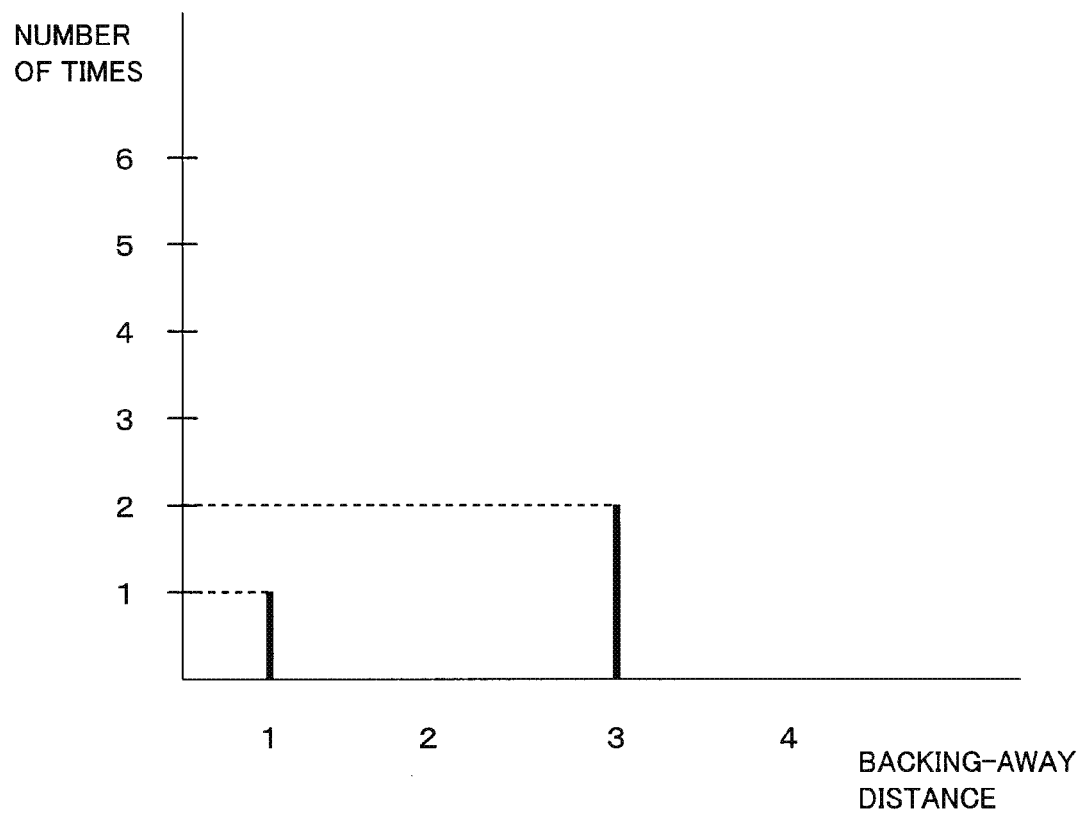
FIG. 9 is a figure showing an example of backing-away distances and a plurality of number of times.

The working steps estimation unit 21 can output the calculated backing-away distance and the number of times it is calculated as a graph. For example, FIG. 9 shows a graph in which the horizontal axis is the backing-away distance and the vertical axis is the number of times it is calculated as is similar to FIG. 6, and indicates that two times for the backing-away distance 3 and one time for the backing-away distance 1. The working steps estimation unit 21 stores the calculated backing-away distance and the number of times it is calculated in a transition analysis information storage unit 22.

Where, the evaluation administrator or the like can specify the backing-away distance and the number of times it is calculated in advance, and store in the standard transition analysis information storage unit 22. That is, for example, the standard backing-away distance and the number of times thereof that are scheduled in advance as shown in FIG. 9 can be specified as the standard transition information. In this case, the standard transition information storage unit 20 and the working steps estimation unit 21 can be excluded.

The transition analysis information comparison unit 23 compares the backing-away distance and number of times it is calculated stored in the transition analysis information storage unit 18 and the backing-away distance and the number of times it is calculated of the standard transition stored in the standard transition analysis information storage unit 22.

Figure 10:
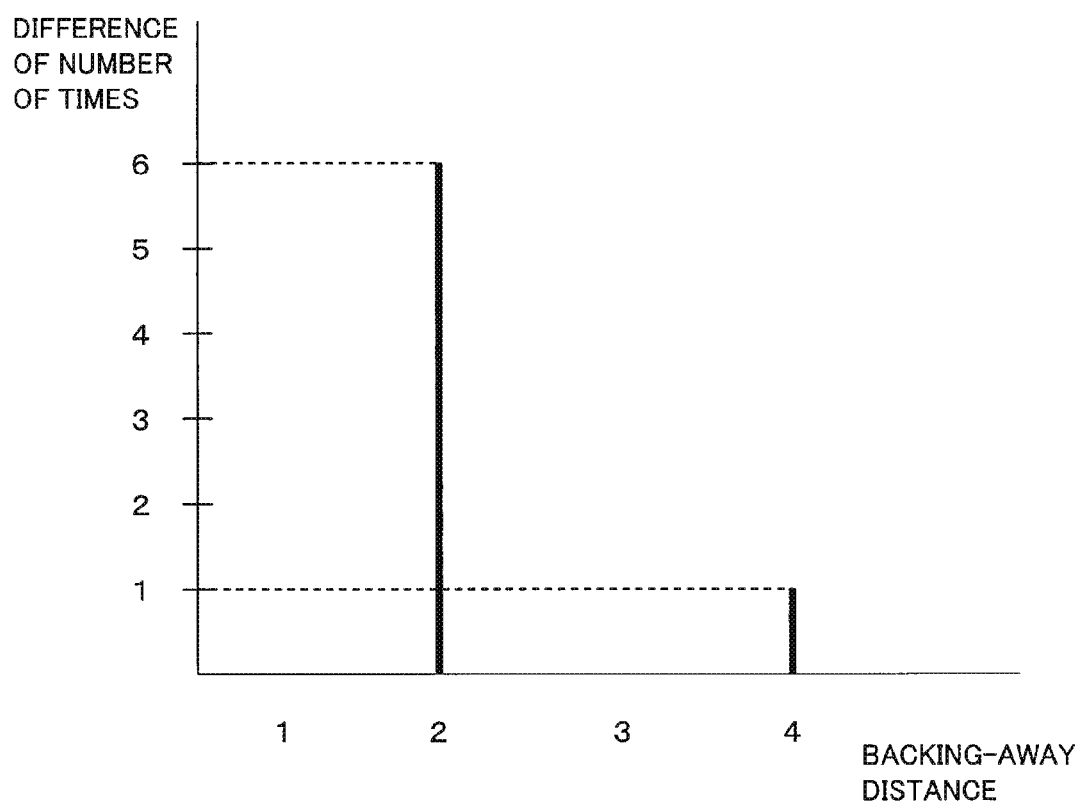
FIG. 10 is a figure showing an example of backing-away distances and a plurality of number of times.

Specifically, the transition analysis information comparison unit 23 calculates and thereby outputs the difference of number of times for each backing-away distance between the number of times the backing-away distance is calculated on each backing-away distance stored in the transition analysis information storage unit 18 and the number of times the backing-away distance is calculated on each backing-away distance in the standard transition stored in the standard transition analysis information storage unit 22. For example, when it calculates a difference for each backing-away distance between the number of times the backing-away distance is calculated for each backing-away distance stored in the transition analysis information storage unit 18 as shown in FIG. 6 and the number of times the backing-away distance is calculated for each backing-away distance in the standard transition stored in the standard transition analysis information storage unit 22 as shown in FIG. 9, it can get a graph as shown in FIG. 10. FIG. 10 indicates the difference between an actual result of the backing-away distance occurred and the number of times the backing-away distance occurred in an actual development process and the backing-away distance and the number of times of occurrence of the standard backward transition in the standard development process expected in advance.

Based on information on the difference of number of times, the transition analysis information comparison unit 23 outputs information indicating either the development internal factor or the development external factor as the cause of development delay to the output unit 24.

For example, the transition analysis information comparison unit 23 can output to the output unit 24 or the like either information (i.e. first development delay factor information) indicating that the cause of development delay is the development external factor when the difference of number of times whose backing-away distance is equal to or more than specified distance is equal to or more than specified number of times, or information (i.e. second development delay factor information) indicating that the cause of development delay is the development internal factor when the difference of number of times whose backing-away distance is less than specified distance is equal to or more than specified number of times. The output unit 24 is a display means such as a display device. The first development delay factor information can include such as information indicating a change of the customer requirement, besides information which directly shows that the cause of development delay is the development external factor. The second development delay factor information can include such as information indicating a company name or a team name, information indicating a change in members among developers or a change histories of the software in software facilities, besides information indicating directly that the cause of development delay is the development internal factor.

Then, it will describe an example of the operation of the process evaluation device 1 according to the exemplary embodiment with reference to FIG. 8 to FIG. 11.

Figure 8:
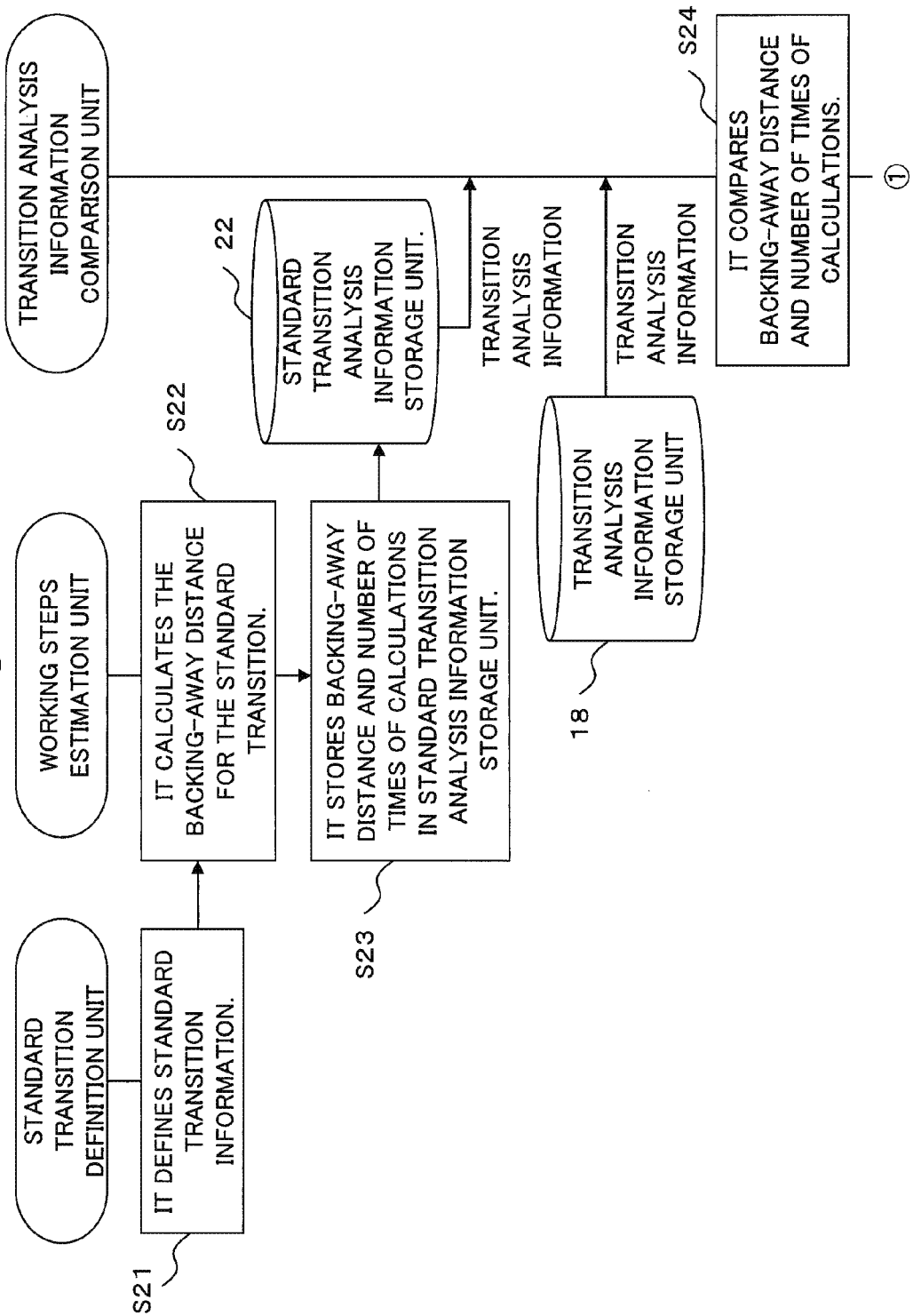
FIG. 8 is a figure showing an example of an operation according to the second exemplary embodiment.

As shown in FIG. 8, the process evaluators or the like specify the standard transition information using the standard transition configuration unit 19 (Step S21). The working steps estimation unit 21 calculates the backing-away distance for specified standard transition information (Step S22) and stores the backing-away distance and the number of times the backing-away distance is calculated in the standard transition analysis information storage unit 22 (Step S23). FIG. 9 is a graph showing information stored in the standard transition analysis information storage unit 22. This graph is the graph in which the horizontal axis is the backing-away distance and the vertical axis is the number of times the backing-away distance is calculated. Then, the transition analysis information comparison unit 23 refers to the transition analysis information storage unit 18 and the standard transition analysis information storage unit 22, and compares the backing-away distance and the number of times the backing-away distance is calculated stored in those (Step S24). Specifically, the transition analysis information comparison unit 23 calculates on each backing-away distance the difference of number of times between the number of times the backing-away distance is calculated on each backing-away distance stored in the transition analysis information storage unit 18 (refer to FIG. 6) and the number of times the backing-away distance is calculated on each backing-away distance in the standard transition stored in the standard transition analysis information storage unit 22 (refer to FIG. 9), and outputs to the output unit 24.

FIG. 10 shows a graph indicating information which the transition analysis information comparison unit 23 output in Step S24. The graph shown in FIG. 10 is a difference between the graph shown in FIG. 6 and the graph shown in FIG. 9, and it is a calculated difference of number of times for each backing-away distance.

By outputting these kinds of information, the process evaluators can apprehend how many backing-away distances and how many number of times it exceeded in the actual development process compared with the standard transition.

Figure 11:
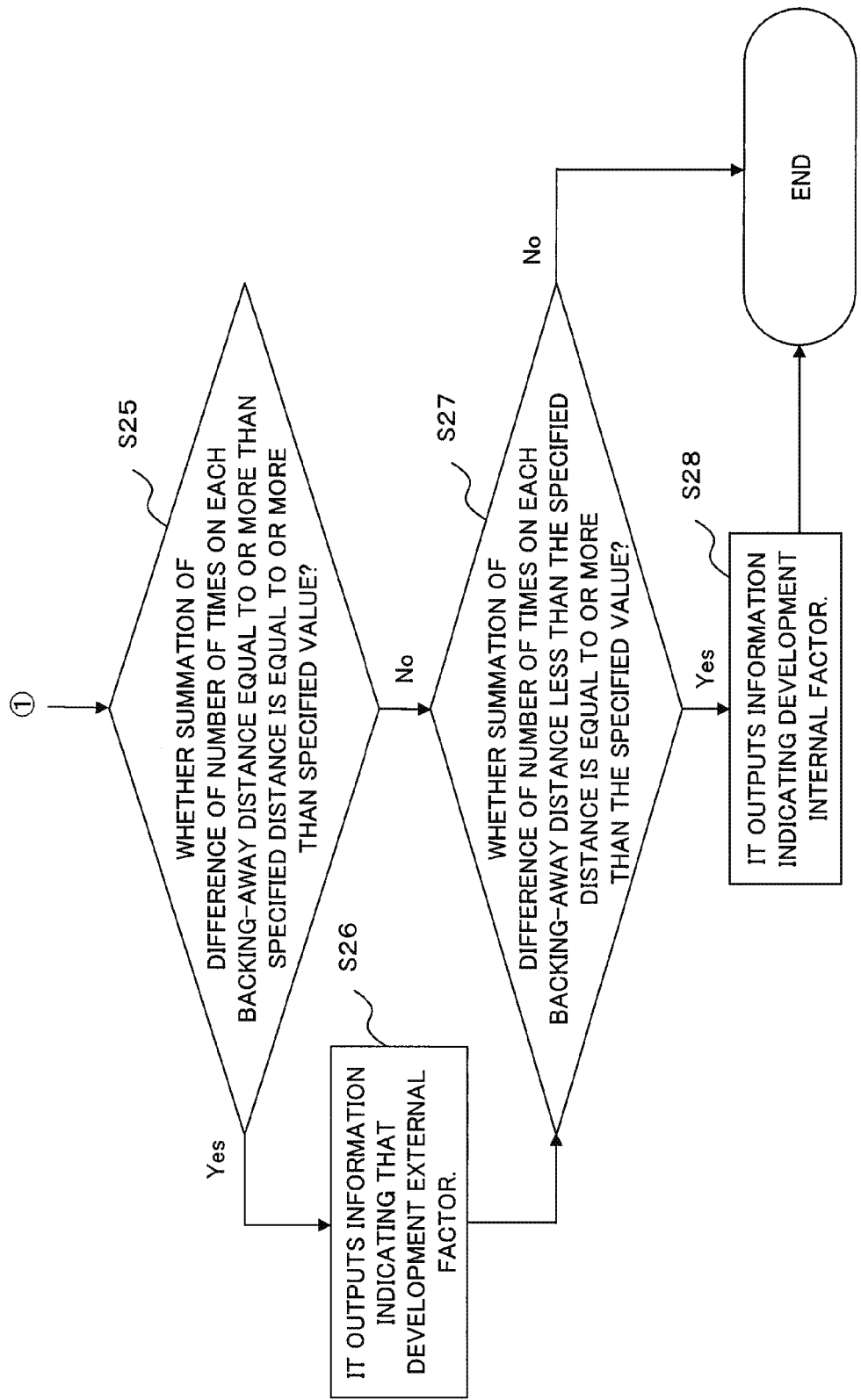
FIG. 11 is a figure showing an example of an operation according to the second exemplary embodiment.

Then, as shown in FIG. 11, the transition analysis information comparison unit 23 determines whether or not the summation of the difference of number of times on each backing-away distance equal to or more than specified distance is equal to or more than specified value (Step S25). Specified distances and specified values are a distance and a value specified by the process evaluators or the like in advance. When the determination result in Step S25 is "Yes", the transition analysis information comparison unit 23 outputs information indicating that the cause of development delay is the development external factor to the output unit 24 (Step S26). In the case that either the determination result of Step S25 is "No" or after Step S26, the transition analysis information comparison unit 23 determines whether or not the summation of the difference of number of times on each backing-away distance less than specified distance is equal to or more than specified value (Step S27). When the determination result of Step S27 is "Yes", then the transition analysis information comparison unit 23 outputs information indicating that the cause of development delay is the development internal factor to the output unit 24, and finishes the process (Step S28). When the determination result of Step S27 is "No", it finishes just as it is.

It will describe a specific example of the process in FIG. 11. Where, it will describe the specific example with reference to the graph in FIG. 10 supposing that specified distance is 3 and specified value is 4. First, in Step S25, the transition analysis information comparison unit 23 calculates the summation of the difference of number of times for each backing-away distance which is equal to or more than specified distance (i.e. 3 in this case). Following to an example in FIG. 10, because the difference of number of times of the backing-away distance 3 is 0 and the difference of number of times of the backing-away distance 4 is 1, the summation of the difference of number of times for each backing-away distance equal to or more than specified distance (i.e. 3 in this case) becomes 1 (=0+1). Because this value is less than specified value 4, the determination result of Step S25 will be "No". Then, in Step S27, the transition analysis information comparison unit 23 calculates the summation of the difference of number of times for each backing-away distance which is less than specified distance (i.e. 3 in this case). In an example of FIG. 10, because the difference of number of times of the backing-away distance 2 is 6 and the difference of number of times of the backing-away distance 1 is 0, the summation of the difference of number of times for each backing-away distance which is less than specified distance (i.e. 3 in this case) becomes 6 (=6+0). Because this value which is specified value is equal to or more than 4, the determination result of Step S27 will be "Yes". Accordingly, a step in the transition analysis information comparison unit 23 shift to Step S28 and it outputs information indicating that the cause of development delay is the development internal factor, and it finishes.

By outputting these kinds of information, the process evaluators can apprehend that the cause of the development delay is either the development external factor or the development internal factor in the actual development process.

Where, in the above-mentioned descriptions, even though it is based on the summation of the difference of number of times for each backing-away distance as the criterion for isolating the cause of development delay of either the development external factor or the development internal factor, it is not limited to this criterion. For example, instead of calculating the summation, it can determine that the cause of development delay is the development external/internal factor when the number of times whose backing-away distance equal to or more than/less than specified distance is equal to or more than specified value. According to the exemplary embodiment, by setting the standard transition and comparing the standard transition and actual transition, the process evaluators can apprehend how many backing-away distances and how many number of times it is exceeding for the actual development process compared with the standard transition.

In addition, in the actual development process, the process evaluators can apprehend that the cause of the development delay is either the development external factor or the development internal factor.

<Exemplary Embodiment 3>

Then, it will describe the third exemplary embodiment according to the present invention. The configuration of the process evaluation device 1 according to the exemplary embodiment is similar to FIG. 7.

According to the second exemplary embodiment, the cause of development delay is determined to be either the development internal factor or the development external factor based on the backing-away distance and the number of times it is calculated. On the other hand, according to the exemplary embodiment, based on how many backing-away distances are occurred by backward transition which occurred after backward transition occurred in specified number of times, the cause of development delay is determined to be either the development internal factor or the development external factor.

When backward transition occurred, the transition information analysis unit 17 according to the exemplary embodiment calculates the backing-away distance and stores them together with information indicating which number of times the backward transition occurred in the transition analysis information storage unit 18.

Figures 12, 13:
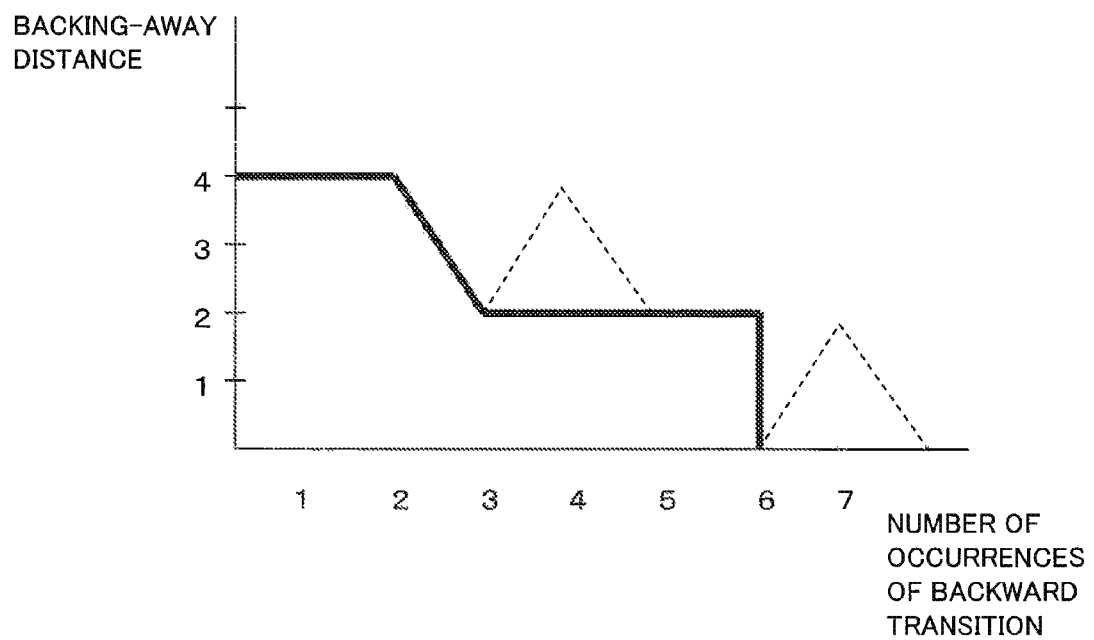
FIG. 12 is a figure showing an example of a standard transition analysis information storage unit according to the third exemplary embodiment.
FIG. 13 is a figure showing an example of a plurality of number of occurrences of backing-away transition and backing-away distances.

As shown in FIG. 12, the standard transition analysis information storage unit 22 according to the exemplary embodiment correlates and stores the backing-away distance (i.e. first backing-away distance) and the number of occurrences of backward transition (first number of times). For example, the process evaluators or the like specify concerned backing-away distance and the number of occurrences of backward transition using the standard transition configuration unit 19.

When backward transition occurs, the transition analysis information comparison unit 23 according to the exemplary embodiment counts the number of times of occurrences thereof. When backward transition occurs, the transition analysis information comparison unit 23 refers to the transition analysis information storage unit 18 and the standard transition analysis information storage unit 22, and when the count value is larger than the number of occurrences (i.e. first number of times) of backward transition which is stored in the standard transition analysis information storage unit 22 and the backward distance at backward transition concerned is larger than the backing-away distance (i.e. first backing-away distance) which is stored in the standard transition analysis information storage unit 22, then it outputs information indicating that the cause of development delay is the development external factor.

The meanings of the backing-away distance (i.e. first backing-away distance) and the number of occurrences of backward transition (i.e. first number of times) which are stored in the standard transition analysis information storage unit 22, will be described as follows.

It can be though that there exists a fixed pattern in an aspect of repetition of the development in Agile development and Iteration development. That is, it is in an early stage of whole the development processes where backward transition occurs even to the process of the requirement definition or the architecture design which are positioned in an early development process, and it is a rare case that it gets back even to the process of the requirement definition or the architecture design as backward transition once the requirement definition and the architecture design are converged, it can be considered to return back to the process of the function design or the resource design in the most cases. That is, ideally, it is expected that the backing-away distance will be decreased or not increased with elapse of time (in other words, number of occurrences of backward transition). The solid line in FIG. 13 indicated this state. FIG. 13 shows a graph in which the horizontal axis is the number of occurrences of backward transition and the vertical axis is the backing-away distance.

Solid lines in graph of FIG. 13 indicate that the backing-away distance in backward transition of the first time and the second time is 4, the backing-away distance in backward transition of the third time to the sixth time, that are the count values of 3 to 6, is 2 respectively, and there are no further backward transitions.

Ideally, It can be thought that the backing-away distance will be decreased (i.e. not increased) with the increase of the number of times of backward transition occurrence. a case that number of times of occurrence of the backward transition will be increased. In contrast, when the backing-away distance is large even though the number of times of occurrence of backward transition is large, it means that it returned to the early processes of the development again, and it can consider that the cause of the occurrence of backward transition can be considered to come from a change in the customer requirement which is in the development early process.

Accordingly, according to the exemplary embodiment, by specifying the predefined distance (e.g. 3) as the backing-away distance (i.e. first backing-away distance) and predefined number of times (e.g. 3) as the number of times of the occurrence of backward transition (i.e. first number of times).

the transition analysis information comparison unit 23 outputs the information indicating that the cause of development delay is the development external factor when the backing-away distance in backward transition which occurred after the first number of times (i.e. third time in this case) is equal to or more than the first backing-away distance (i.e. 3 in this case).

For example, because the dashed line in FIG. 13 indicates that backward transition of the backing-away distance 4 occurred at the fourth time of backward transition, it means that the backing-away distance in backward transition which occurred after the first number of times (i.e. third time in this case) will be equal to or more than the first backing-away distance (i.e. 3 in this case), and the transition analysis information comparison unit 23 outputs the information indicating that the cause of development delay is the development external factor to the output unit 24.

In this way, it is desirable to specify the first number of times in the standard transition analysis information storage unit 22 considering the number of times or the like that are thought to be the number of time or the like requirement definition process and the architecture design process which are in the initial stage of the process converged by the process evaluators or the like.

In addition, the standard transition analysis information storage unit 22 can correlate the second number of times, which is larger than the first number of times that is the number of occurrences of backward transition, with the second backing-away distance and then stores. For example, FIG. 14 indicates a state that the standard transition analysis information storage unit 22 stores 3 as the first number of times and 3 as the first backing-away distance and 6 as the second number of times and 3 as the second backing-away distance respectively.

In this case, when backward transition occurs, in the case that the count value is larger than the second number of times and the backing-away distance in backward transition concerned is smaller than the second backing-away distance, the transition analysis information comparison unit 23 outputs information indicating that the cause of development delay is the development internal factor.

It will describe the second number of times which is stored as a value larger than the first number of times. As mentioned above, in Agile development and Iteration development, it is expected that the backing-away distance is decreased or not-increased with passage of time (i.e. number of occurrences of backward transition). Then, backward transition does not occur any more at a certain stage and finishes the development. Therefore, as shown in the dashed line in FIG. 13, when backward transition continues to occur after a certain number of times (e.g. sixth times in this case), it can consider that the delay of the development is thought to occur.

Accordingly, the process evaluators or the like specify specified distance as the second backing-away distance so that the cause of development delay can be considered to be a development internal factor when backward transition less than specified distance designated in advance occurred. In addition, the process evaluators or the like specify the number of times after which the development is converged and backward transition would not occur any more as the second number of times.

As a result, the process evaluators or the like can recognize that the cause of delay is the development internal factor.

For example, according to an example shown in FIG. 14, 6 is specified as the second number of times, and 3 is specified as the second backing-away distance.

Accordingly, as shown in the dashed line in FIG. 13, when backward transition of the seventh time occurs and backing-away distance thereof is 2, the transition analysis information comparison unit 23 outputs the information indicating that the cause of development delay is the development internal factor to the output unit 24.

Where, for example, in the graph of FIG. 13, when backward transition of the seventh time occurs and backing-away distance thereof is 4, because the backing-away distance in backward transition which occurred after the first number of times (i.e. third times in this case) is equal to or more than the first backing-away distance (i.e. 3 in this case), the transition analysis information comparison unit 23 outputs to the output unit 24 information indicating that the cause of development delay is the development external factor.

In this way, when the development delay has occurred, the process evaluators can recognize the cause of development delay either the development external factor or the development external factor.

According to the exemplary embodiment, it focus on how many times backward transition occurred and determines the cause of development delay of either the development internal factor or the development external factor based on which degree of backing-away distance occurred on which times of backward transition, it can provide the process evaluation device which can apprehend the cause of development delay.

<Exemplary Embodiment 4>

Then, it will describe the fourth exemplary embodiment according to the present invention. The configuration of the process evaluation device 1 according to the exemplary embodiment is similar to FIG. 1 or FIG. 7.

According to the above-mentioned exemplary embodiment, it determined a cause of development delay of either the development internal factor or the development external factor based on the number of times of transition of processes and the backing-away distances. On the other hand, according to the exemplary embodiment, when a process retention time (i.e. time while a development process transited to transit to a next process) in the same process is increased with passage of time, in the case that the same process is performed repeatedly, the information indicating that the cause of development delay is the development internal factor is output.

In Agile development and Iteration development, when the same process is performed repeatedly, it is expected that the process retention time in the same process is decreased or not increased with increase in time (i.e. number of occurrences of backward transition). The reason is because, whenever the number of times the same process is performed increase, it is thought that the developer's experience is increased and work efficiency is improved accordingly.

On the other hand, when a process retention time in the same process is increased with passage of time in the case that a same process is performed repeatedly, it means that the work efficiency of the development is deteriorated, so, the cause is considered to come from the development internal factor such as a rotation of the developers or an addition of non-proficient developers when the development delay has occurred. The exemplary embodiment is focusing on this point and when the process retention time in the same process is increasing with passage of time, the transition analysis information comparison unit 23 outputs the information indicating that the cause of development delay is the development internal factor.

The transition information acquisition unit 15 according to the exemplary embodiment acquires the process retention time while it transits to a development process to transits to a next process from the development supporting device or the like as well as the process identification information and the sequence number thereof, and stores in the transition information storage unit 16. In addition, in that case, the transition information acquisition unit 15 correlates the time when the information (i.e. process retention time and process identification information or the sequence number thereof) was acquired from the development supporting device or the like with those information and stores in the transition information storage unit 16.

That is, following to FIG. 3 as an example, because time period from the development process transits to the function design process (i.e. the sequence number of 3) to it transits to the next process which is the resource design (i.e. the sequence number of 4) is a time that the developers spent for the function design process, the development supporting device or the like transmits the process identification information as the function design or the sequence number 3 thereof in addition to the time concerned to the transition information acquisition unit 15. Then, the transition information acquisition unit 15 acquires this information, and stores in the transition information storage unit 16 after attaching a data of time when these information were acquired. The development supporting device or the like can transmit the data of time when the process retention time was transmitted, to the transition information acquisition unit 15.

As a result, the transition information storage unit 16 stores on each process identification information (or the sequence number thereof) the process retention time and the acquired time thereof (or a time when the development supporting device or the like transmitted the information).

When the process retention time in the same process increasing with passage of time, the transition information analysis unit 17 according to the exemplary embodiment outputs the information indicating that the cause of development delay is the development internal factor to the display unit or the like which is not illustrated.

Then, it will describe the example of the operation of the process evaluation device 1 according to the exemplary embodiment with reference to FIG. 15.

The transition information acquisition unit 15 acquires the process retention time on each process from the development supporting device (Step S41). That is, the transition information acquisition unit 15 acquires the process identification information and the process retention time. Whenever the process transits, the development supporting device transmits the process retention time. Accordingly, when it repeatedly transits to the same process, a plurality of information on the process retention time corresponding to the same process identification information are transmitted to the transition division acquisition unit 15.

Then, the transition information acquisition unit 15 stores the process retention time and the time in a transition information storage unit 16 for each process (Step S42). That is, when the transition information acquisition unit 15 acquires the time the process retention time is acquired from the development supporting device by a clock or the like in inside or outside of the process evaluation device 1 when it acquired the process retention time from the development supporting device. Then, the transition information acquisition unit 15 correlates the process identification information, the process retention time and the time when those were acquired, and stores in the transition information storage unit 16. Where, it is supposed that both information on the process identification information is the function design, the process retention time is α time and the time is t1 and information on the process identification information is the function design, the process retention time is β time and the time is t2, are stored in the transition information storage unit 16. Where, it assumes that t1<t2.

Then, the transition information analysis unit 17 calculates the difference between a process retention time of a certain process acquired at a certain time and the process retention time of the process concerned which was acquired at the previous time which is different from above-mentioned time (Step S43). For example, in the above-mentioned example, the transition analysis unit 17 calculates a difference β−α between the process retention time β of the function design acquired at time t2 and the process retention time α of the function design which was acquired at the previous time t1 before time t2.

When the difference is positive (i.e. β−α>0), because the process retention time is increasing (i.e. α is less than β) even though the time is increasing (i.e. t1 is less than t2), the transition information analysis unit 17 outputs information indicating that the cause of development delay is the development internal factor (Step S44).

According to the exemplary embodiment, when the process retention time in the same process is increasing with passage of time in the case of repeatedly performing the same process, because it output the information indicating that the cause of development delay is the development internal factor, the process evaluators or the like can apprehend the cause of development delay when the development delay has occurred.

<Exemplary Embodiment 5>

Figure 16:
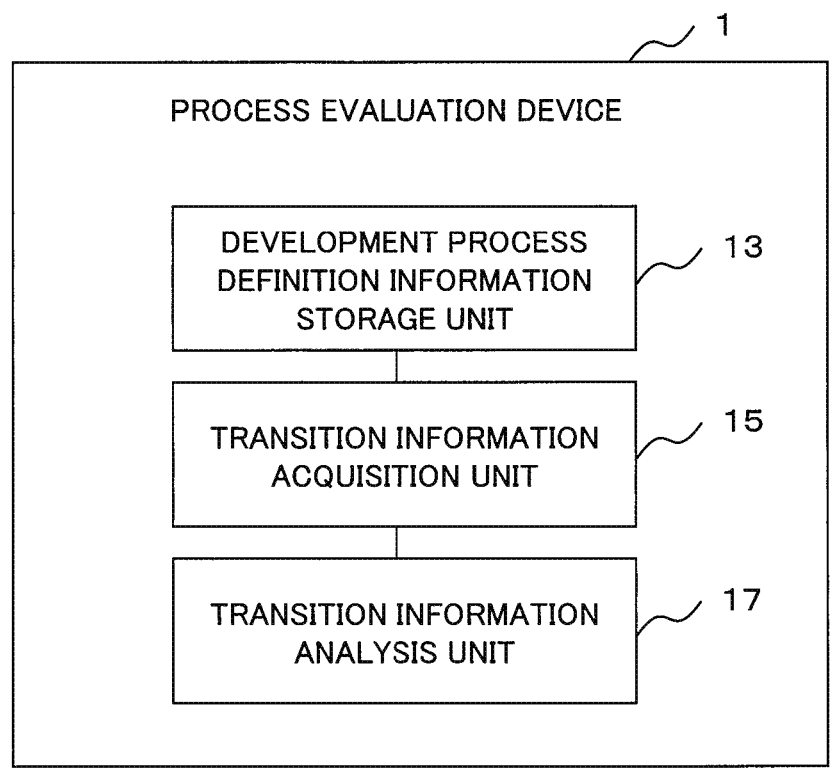
FIG. 16 is a figure showing an example of a configuration according to the fifth exemplary embodiment.

Then, it will describe the fifth exemplary embodiment according to the present invention with reference to FIG. 16.

As shown in FIG. 16, the process evaluation device 1 according to the exemplary embodiment includes the development process definition unit 13, the transition information acquisition unit 15 and the transition information analysis unit 17.

The development process definition storage unit 17 stores definition information on a plurality of process for developing applications and the sequence numbers thereof.

The transition information acquisition unit 15 acquires identification information or the sequence number of a process after the transition at backward transition which is transition when the sequence number of process which was transited next to specified process that is an evaluation cardinal point is smaller than the sequence number of above-mentioned evaluation cardinal point.

The transition information analysis unit 17 calculates and thereby outputs a backing-away distance which is a difference between the sequence number of the evaluation cardinal point and the sequence number of above-mentioned process acquired by the transition information acquisition unit 15.

According to the exemplary embodiment, when a process which was transited next to a process which is the evaluation cardinal point is a previous process, it can calculate a backing-away distance which is defined by a difference between the sequence number of process which is an evaluation cardinal point and the sequence number of process after the transition. When the calculated backing-away distance is equal to or more than specified distance designated in advance, the transition information analysis unit 17 can output alarms to the developers and the process evaluators or the like.

In addition, it is possible to indicate a graph in which it can apprehend the backing-away distance and the number of times it is calculated as shown in FIG. 6.

Therefore, it can provide the development process evaluation device, the program and the method by which it can apprehend the cause of development delay by the size of the backing-away distance and the number of times the backing-away distance is calculated or the like.

While having described an invention of the present application referring to the embodiments, the invention of the present application is not limited to the above mentioned embodiments. It is to be understood that to the configurations and details of the invention of the present application, various changes can be made within the scope of the invention of the present application by those skilled in the arts.

This application is based upon and claims the benefit of priority from Japanese patent application "No". 2011-203977, filed on Sep. 19, 2011, the disclosure of which is incorporated herein in its entirety by reference.

DESCRIPTION OF CODES 1 process evaluation device
11 development process definition unit
12 evaluation cardinal point configuration unit
13 development process definition information Storage Unit
14 evaluation cardinal point storage unit
15 transition information acquisition unit
16 transition information storage unit
17 transition information analysis unit
18 transition analysis information storage unit
19 standard transition configuration unit
20 standard transition information storage unit
21 working steps estimation unit
22 standard transition analysis information Storage Unit
23 transition analysis information comparison unit
24 output unit

The invention claimed is:

1. A processor-executed process evaluation method, comprising:
   storing definition information on a plurality of processes for developing software and sequence numbers thereof in a development process definition storage means;
   acquiring identification information or a sequence number of a new process after a backward transition occurs, wherein a process transition from an evaluation origin to said new process is said backward transition when a sequence number of said new process is smaller than a sequence number of said evaluation origin and
   calculating and thereby outputting a backing-away distance, which is a difference between a sequence number of said evaluation origin and a sequence number of said new process, for said backward transition.

2. The processor-executed process evaluation method according to claim 1, comprising:
   storing a number of times on each said backing-away distance in a standard transition analysis information storage means;
   acquiring said identification information or said sequence number of process after said transition from a development supporting device which detects transition of a process; and
   calculating and thereby outputting on each said backing-away distance a difference of number of times between a number of times said backing-away distance is calculated on each calculated said backing-away distance and said number of times on each said backing-away distance which is stored in said standard transition analysis information storage means.

3. The processor-executed process evaluation method according to claim 2, comprising:
   outputting a first development delay factor information when said difference of number of times of said backing-away distance whose said backing-away distance is equal to or more than specified distance is equal to or more than specified number of times; and
   outputting a second development delay factor information when said difference of number of times of said backing-away distance whose said backing-away distance is less than specified distance is equal to or more than specified number of times.

4. The processor-executed process evaluation method according to claim 1, further comprising:
outputting a first development delay factor information when a backing-away distance in said backward transition is larger than said designated said backing-away distance in the case that said backward transition is said backward transition occurred after said number of times which is stored in said standard transition analysis information storage means for correlating a designated backing-away distance and a number of times of said designated backward transition and storing.

5. The processor-executed process evaluation method according to claim 4, comprising:
storing further a designated second backing-away distance and a second number of times which is larger than said number of times of said designated backward transition in said standard transition analysis information storage means, and
outputting a second development delay factor information when a backing-away distance in said backward transition is less than said second backing-away distance in the case that said backward transition is said backing-away transition which occurred after said backward transition of said second number of times.

6. The processor-executed process evaluation method according to claim 1, comprising: acquiring a process retention time on each process from transition time to each process to further transition time to a next process; and
outputting a second development delay factor information when a process retention time in the same process is increasing with passage of time.

7. A process evaluation device, comprising:
a development process definition memory storage unit which stores definition information on a plurality of processes for developing software and sequence numbers thereof;
a transition information acquiring unit which acquires identification information or a sequence number of a new process after a backward transition occurs, wherein a process transition from an evaluation origin to said new process is said backward transition when a sequence number of said new process is smaller than a sequence number of said evaluation origin; and
a transition information analysis unit which calculates and thereby outputs a backing-away distance, which is a difference between a sequence number of said evaluation origin and a sequence number of said new process, for said backward transition.

8. The process evaluation device according to claim 7, which is connected with a development supporting device for detecting transition of a process characterized and wherein said transition information acquisition unit acquires said identification information or said sequence number of process after said transition from said development supporting device, further comprising:
a standard transition analysis information storage unit which stores a number of times on each said backing-away distance; and
a transition analysis information comparison unit which calculates and thereby outputs on each said backing-away distance a difference of number of times between a number of times said backing-away distance is calculated on each said backing-away distance which said transition information analysis unit calculated and said number of times on each said backing-way distance which is stored in said standard transition analysis information storage unit.

9. The process evaluation device according to claim 8, wherein
said transition analysis information comparison unit outputs a first development delay factor information when said difference of number of times of said backing-away distance whose said backing-away distance is equal to or more than specified distance is equal to or more than specified number of times; and outputs a second development delay factor information when said difference of number of times of said backing-away distance whose said backing-away distance is less than specified distance is equal to or more than specified number of times.

10. The process evaluation device according to claim 7, further comprising:
a standard transition analysis information storage unit which correlates a designated backing-away distance and a number of times of said designated backward transition and stores; and
a transition analysis information comparison unit which outputs information indicating a first development delay factor information when a backing-away distance in said backward transition is larger than said designated said backing-away distance in the case that said backing-away transition is said backward transition occurred after said number of times which is stored in said standard transition analysis information storage unit.

11. The process evaluation device according to claim 10 wherein,
said standard transition analysis information storage unit further stores a designated second backing-away distance and a second number of times which is larger than said number of times of said designated backward transition, and
said transition analysis information comparison unit outputs a second development delay factor information when a backing-away distance in said backward transition is less than said second backing-away distance in the case that said backward transition is said backward transition which occurred after said backward transition of said second number of times.

12. The process evaluation device according to claim 7 wherein,
said transition information acquisition unit acquires a process retention time on each process from transition time to each process to further transition time to a next process, and
said transition information analysis unit outputs information indicating a development internal factor when a process retention time in the same process is increasing with passage of time.

13. A non-transient computer-readable medium which stores a process evaluation program which causes a computer having a development process definition storage means for storing definition information on a plurality of processes for developing software and sequence numbers thereof to perform:
a transition information acquisition step for acquiring identification information or a sequence number of a new process after a backward transition occurs, wherein a process transition from an evaluation origin to said new process is said backward transition when a sequence number of said new process is smaller than a sequence number of said evaluation origin and a transition information analysis step for calculating and thereby outputting a backing-away distance, which is a difference between a sequence number of said evaluation origin and a sequence number of said new process, for said backward transition.

14. The non-transient computer-readable medium according to claim 13, which stores a process evaluation program which causes said computer, which is connected with a development supporting device which detects transition of process and includes a standard transition analysis information storage means which stores a number of times on each said backing-away distance, to perform:
said transition information acquisition step for acquiring said identification information or said sequence number of process after said transition from said development supporting device and further comprising;
a transition analysis information comparison step for calculating and thereby outputting on each said backing-away distance a difference of number of times between a number of times said backing-away distance is calculated on each said backing-away distance and said number of times on each said backing-away distance which is stored in said standard transition analysis information storage means.

15. The non-transient computer-readable medium according to claim 14 which stores a process evaluation program which causes said computer to perform:
a step of outputting a first development delay factor information when said difference of number of times of said backing-away distance whose said backing-away distance is equal to or more than specified distance is equal to or more than specified number of times; and
a step of outputting a second development delay factor information when said difference of number of times of said backing-away distance whose said backing-away distance is less than specified distance is equal to or more than specified number of times.

16. The non-transient computer-readable medium according to claim 13, which stores a process evaluation program which causes said computer, which further comprise a standard transition analysis information storage means for correlating a designated backing-away distance and a number of times of said designated backward transition and storing,
to perform:
further step of outputting a first development delay factor information when a backing-away distance in said backward transition is larger than said designated said backing-away distance in the case that said backing-away transition is said backward transition occurred after said number of times which is stored in said standard transition analysis information storage means.

17. The non-transient computer-readable medium according to claim 16 which stores a process evaluation program which causes said computer,
of which said standard transition analysis information storage means stores further a designated second backing-away distance and a second number of times which is larger than said number of times of said designated backward transition, to perform:
said transition analysis information comparison step further comprising outputting a second development delay factor information when
a backing-away distance in backward transition concerned is less than said second backing-away distance in the case that said backward transition is said backward transition which occurred after said backward transition of said second number of times.

18. The non-transient computer-readable medium according to claim 13 which stores a process evaluation program which causes said computer to perform:
said transition information acquisition step for acquiring a process retention time on each process from transition time to each process to further transition time to a next process; and
said transition information analysis step for outputting a second development delay factor information when a process retention time in the same process is increasing with passage of time.

19. A process evaluation device, comprising:
a development process definition memory storage means for storing definition information on a plurality of processes for developing software and sequence numbers thereof;
a transition information acquiring means for acquiring identification information or a sequence number of a new process after a backward transition occurs, wherein a process transition from an evaluation origin to said new process is said backward transition when a sequence number of said new process is smaller than a sequence number of said evaluation origin; and
a transition information analysis means for calculating and thereby outputting a backing-away distance, which is a difference between a sequence number of said evaluation origin and a sequence number of said new process, for said backward transition.

* * * * *